US011872710B2

(12) United States Patent
Wright et al.

(10) Patent No.: US 11,872,710 B2
(45) Date of Patent: Jan. 16, 2024

(54) RAZOR COMPONENT INCLUDING A PRESSURE-RESPONSIVE PHASE-CHANGE COMPONENT

(71) Applicant: Société BIC, Clichy (FR)

(72) Inventors: Chris Wright, London (GB); David Duffy, Vaud (CH)

(73) Assignee: Société BIC, Clichy (FR)

(*) Notice: Subject to any disclaimer, the term of this patent is extended or adjusted under 35 U.S.C. 154(b) by 8 days.

(21) Appl. No.: 17/756,807

(22) PCT Filed: Dec. 16, 2020

(86) PCT No.: PCT/EP2020/086470
§ 371 (c)(1),
(2) Date: Jun. 2, 2022

(87) PCT Pub. No.: WO2021/122780
PCT Pub. Date: Jun. 24, 2021

(65) Prior Publication Data

US 2023/0039442 A1 Feb. 9, 2023

(30) Foreign Application Priority Data

Dec. 18, 2019 (EP) .................................... 19217659

(51) Int. Cl.
*B26B 21/40* (2006.01)
*B26B 21/48* (2006.01)
*B26B 21/52* (2006.01)

(52) U.S. Cl.
CPC ...... *B26B 21/4056* (2013.01); *B26B 21/4062* (2013.01); *B26B 21/48* (2013.01); *B26B 21/52* (2013.01)

(58) Field of Classification Search
CPC . B26B 21/4056; B26B 21/4062; B26B 21/48; B26B 21/52
USPC .............................................................. 30/32
See application file for complete search history.

(56) References Cited

U.S. PATENT DOCUMENTS 5,394,777 A * 3/1995 Kozikowski ............ B26B 21/48 30/140
2010/0018056 A1* 1/2010 Lax ....................... B26B 21/446 30/535
2015/0174773 A1* 6/2015 Hodgson ............. B26B 21/4012 30/34.05
2019/0299454 A1* 10/2019 Patel ..................... B26B 21/225
2019/0299455 A1 10/2019 Patel et al.
(Continued)

FOREIGN PATENT DOCUMENTS

EP 3300863 A1 4/2018
WO 01/98040 A1 12/2001
(Continued)

OTHER PUBLICATIONS

International Search Report and Written Opinion in International Application No. PCT/EP2020/086470, dated Mar. 3, 2021 (8 pages).

*Primary Examiner* — Omar Flores Sanchez
(74) *Attorney, Agent, or Firm* — Bookoff McAndrews, PLLC

(57) ABSTRACT

A razor component comprises a cooling element, which is adapted to provide a cooling effect on a user's skin during a shaving operation, wherein the razor component includes a pressure-responsive phase-change component that is coupled to the cooling element.

20 Claims, 9 Drawing Sheets

(56) References Cited

U.S. PATENT DOCUMENTS

| | | | | |
|---|---|---|---|---|
| 2019/0299459 | A1* | 10/2019 | Patel | B26B 21/4012 |
| 2019/0299472 | A1* | 10/2019 | Johnson | B26B 21/227 |
| 2019/0299474 | A1* | 10/2019 | Bourque | B26B 21/446 |
| 2019/0306259 | A1* | 10/2019 | Burghardt | B26B 21/4081 |
| 2020/0316800 | A1* | 10/2020 | Beerwerth | B26B 19/46 |
| 2021/0146560 | A1* | 5/2021 | Panagiotopoulou | B26B 19/40 |
| 2021/0260780 | A1* | 8/2021 | Zafiropoulos | B26B 19/388 |
| 2021/0308888 | A1* | 10/2021 | Gratsias | B26B 21/222 |

FOREIGN PATENT DOCUMENTS

| | | | |
|---|---|---|---|
| WO | 2006/027018 | A1 | 3/2006 |
| WO | 2018/069506 | A1 | 4/2018 |

* cited by examiner

RAZOR COMPONENT INCLUDING A PRESSURE-RESPONSIVE PHASE-CHANGE COMPONENT

This application is a National Stage application of International Application No. PCT/EP2020/086470 filed on 16 Dec. 2020, now published as WO2021/122780A1 and which claims benefit from European patent application EP19217659 filed on Dec. 18, 2019, the entire contents being incorporated herein by reference.

TECHNICAL FIELD

The aspects described in the following disclosure relate to a razor component, a razor head, a razor and a method for providing a cooling effect on a skin surface with a razor.

BACKGROUND

Razors (also known as safety razors) have a razor head that is permanently or removably attached to a razor handle which, in use, is oriented in shaving direction. Razor heads typically comprise one or more cutting members, each supporting a blade, mounted perpendicular to the shaving direction. Razor heads are also typically provided with a guard (at a leading longitudinal side of the razor head in the shaving direction) and a cap (at a trailing longitudinal side of the razor head in the shaving direction). In use, a user holds the razor handle in the shaving direction and brings the razor head into contact with a portion of skin defining a shaving plane.

Typically, the shaving plane is defined as the tangential line intersecting the first and second skin contact points of, for example, cutting edges of the razor head. More simply, the shaving plane may be approximated as a line between the highest points on the skin-contacting surface of a razor head—for example, the flat plane between the top of a guard and the top of a cap of the razor head. During a shaving operation, movement of the razor handle causes the blades of the razor head to be moved across the shaving plane in the shaving direction, enabling the blades to remove unwanted hair.

However, in such a shaving operation and due to the direct contact of the blades to the skin, discomfort may be present and skin irritations may occur. These skin irritations may be, for example, redness, burning and stinging subsequent to a shaving operation. This may be the result of the blades contacting the skin and a corresponding abrasion of outer skin layers. In order to reduce skin irritations and discomfort during shaving operations, various approaches have been pursued in the state of the art. On the one hand, some razors are known in the state of the art that improve gliding characteristics over the skin during a shaving operation using lubricating strips. In addition, razors are also known that comprise cooling agents (such as a menthol liquid) which are applied to the skin during a shaving operation and cause a cooling sensation due to electrochemical signals sent to the brain. On the other hand, to limit the increase in blood flow and to avoid burning and increased warmth during and after a shaving operation, which are typical signs of shave-induced skin irritation, some of the most technologically advanced electric razors comprise an integrated cooling system designed to actively cool the skin during the shaving operation. However, such electric razors with an integrated cooling system lead to increased costs, due to an increased number of components and a more complicated design.

Accordingly, the present disclosure aims to provide a razor component through which the shaving performance of a razor is further improved. In particular, the present disclosure aims at reducing skin irritations and discomfort.

SUMMARY

The present disclosure relates to a razor component according to claim 1, a razor head according to claim 7, a razor according to claim 10 and a method for providing a cooling effect on a skin surface with a razor according to claim 15.

The razor component comprises a cooling element, which is adapted to provide a cooling effect on a user's skin surface during a shaving operation. The razor component includes a pressure-responsive phase-change component that is coupled to the cooling element.

The razor head comprises the razor component as described above.

The razor comprises a razor handle, a razor head and a razor component as described above.

The method for providing a cooling effect on a skin surface comprises the steps of:

a) providing a razor with a razor head and a razor handle, which is coupled to the razor head, and a cooling element, b) applying and/or releasing a pressure on the razor, wherein the cooling element provides a cooling effect on a user's skin surface K during a shaving operation.

It has been discovered that shave-induced skin irritations and discomfort can be reduced by actively cooling the skin during a shaving operation. Thereby, the increase in blood flow is limited, as well as burning and increased warmth. An effect of the aspects discussed above is that during a shaving operation, the razor component comprising the cooling element can provide a cooling effect on the skin surface (or skin). This can lead to reduced skin irritations and can decrease discomfort during the shaving operation.

Another effect of the aspects discussed above is that the razor component providing the cooling effect can be manufactured in a cost-effective and environmentally friendly way. This is due to the fact that the razor component does not need an electrically powered cooling system to provide the cooling effect. Thus, the razor component does not have to be equipped with a battery, wiring or electrical components. This in turn leads to a reduced number of components and a simpler construction. The same applies to the razor head and the razor as described above.

In the following specification, the term "cutting member" means a component of a razor head that, in use, contacts the skin of a user and cuts protruding hairs. A cutting member can mean at least a razor blade having a blade with a cutting edge glued, or laser welded, to a separate bent support member. The bent support member is fitted into a cutting member support slot in-between two opposed cutting member guides, such as protrusions from a transverse frame member of the razor head. The blade can be attached to the face of the bent support member that faces towards a user of the razor head, in use. Alternatively, the blade can be attached to the face of the bent support member that faces away from a user of the razor head, in use. In this latter case, each cutting member has two contact points with the skin of the user (the blade edge, and the distal end of the bent support member), to thus reduce pressure on the user's skin. Alternatively, the cutting member may be a "bent blade". This is an integrally formed cutting member comprising a radiused bend, and a cutting edge formed at a distal end of the radiused bend.

A "group of cutting members" may consist of the same type of cutting members, or may comprise at least one bent blade, or another type of blade for example.

In the following specification, the term "leading" means the side of the razor head that contacts a portion of a user's skin first, in normal use.

In the following specification, the term "trailing" means the side of the razor head that contacts a portion of a user's skin last, in normal use.

In the following specification, the term "pressure-responsive phase-change" describes the ability of an object to change its state as a result of a pressure applied on the object. In particular, "phase-change" does not necessarily mean that an object changes its state of aggregation. Rather, "phase-change" can refer to a structural change of an object, which can occur on both the macroscale and the microscale. As an example, a crystalline phase of a material may change in response to a pressure applied (e.g., from a first crystalline phase into a second, different crystalline phase). In another example, "phase-change" can refer to a change in the molecular structure depending on a pressure applied. Yet in another example, a phase can refer to an orientation of the elements making up the material (e.g., molecules), a degree of order in the material or a short-range or long-range coordination of the material. The "phase-change" may have an effect on the environment, for example, the release of energy to the environment, or the absorption of energy from the environment.

Additional details and features are described in reference to the drawings as follows.

BRIEF DESCRIPTION OF THE DRAWINGS

Other characteristics will be apparent from the accompanying drawings, which form a part of this disclosure. The drawings are intended to further explain the present disclosure and to enable a person skilled in the art to practice it. However, the drawings are intended as non-limiting examples. Common reference numerals on different figures indicate like or similar features.

DETAILED DESCRIPTION

Embodiments of the razor component will be described in reference to the drawings as follows.

Figure 1:
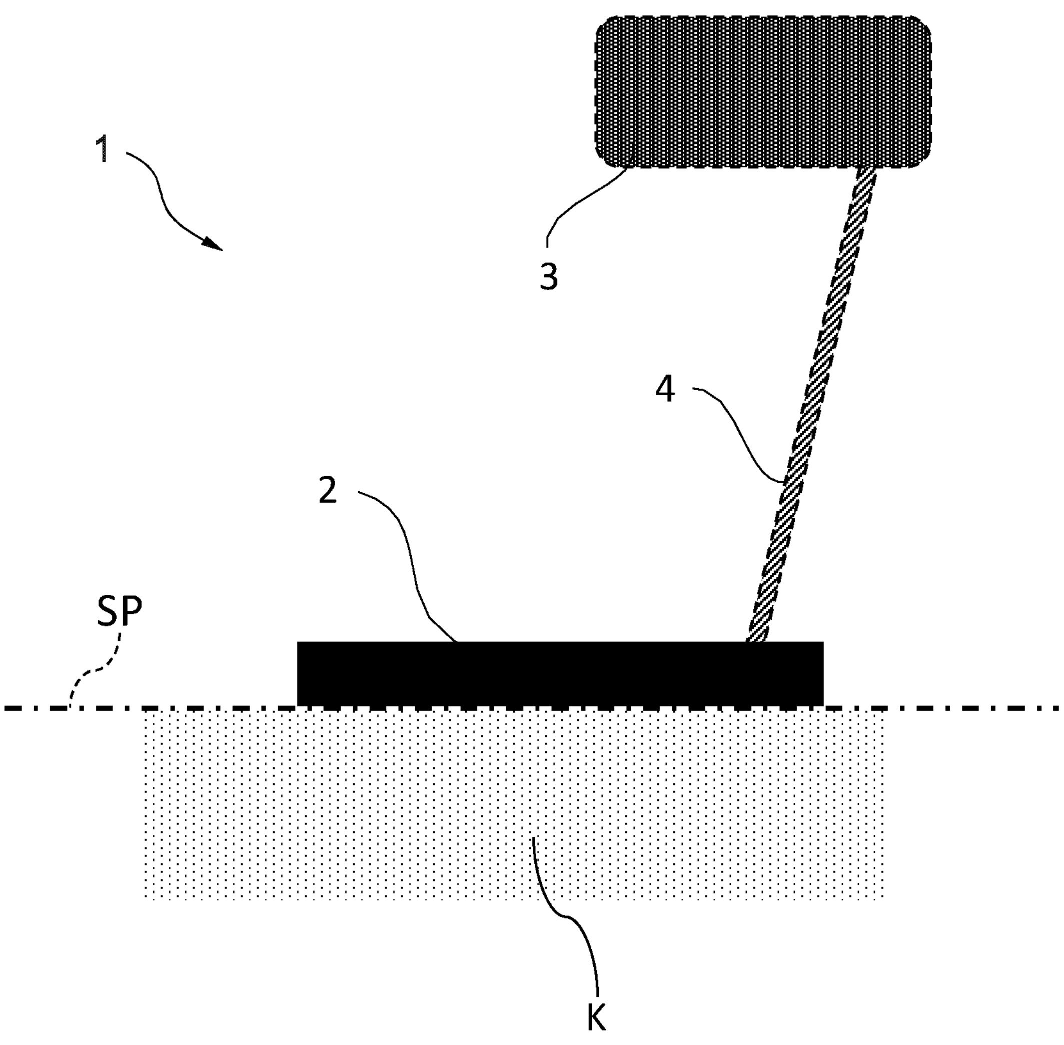
FIG. 1 is a schematic view of a razor component.

FIG. 1 is a schematic view of a razor component 1 according to a first aspect. The razor component 1 comprises a cooling element 2, which is adapted to provide a cooling effect on a user's skin (K) during a shaving operation. The razor component 1 includes a pressure-responsive phase-change component 3, that is coupled to the cooling element 2. During a shaving operation, the cooling element 2 provides a cooling effect on a user's skin (K). This can lead to reduced skin irritations and can decrease discomfort during the shaving operation. Additionally, the razor component 1 providing the cooling effect can be manufactured in a cost-effective and environmentally friendly way. This is due to the fact that the razor component 1 does not need an electrically powered cooling system to provide the cooling effect. Thus, the razor component 1 does not have to be equipped with a battery, wiring or electrical components. This in turn can lead to a reduced number of components and a simpler construction of the razor component 1.

It is to be understood that the razor component 1 can include a plurality of pressure-responsive phase-change components 3 that are coupled to a plurality of cooling elements 2. In particular, the razor component 1 can comprise at least one cooling element 2 and at least one phase-change component 3. Thus, at least one cooling element 2 is coupled to at least one phase-change component 3. It is also conceivable that one cooling element 2 is coupled to at least one phase-change component 3, or that at least one cooling element 2 is coupled to one phase-change component. Therefore, the number of cooling elements 2 does not have to correspond to the number of phase-change components 3.

In case a pressure is applied and/or released on the pressure-responsive phase-change component 3, a phase-change is initiated in the pressure-responsive phase-change component 3. Additionally or alternatively, a negative pressure is applied on the phase-change component 3. The phase-change component 3 comprises a mechanocaloric material, in particular a barocaloric material.

The mechanocaloric effect refers to the reversible thermal response of a solid when subjected to an external mechanical field and encompasses both the elastocaloric effect and the barocaloric effect. Caloric effects arise due to the fact that the disorder of a degree of freedom in solids can be effectively suppressed by an external field around an order-to-disorder transition (a phase change). During such a process, isothermal entropy changes and adiabatic temperature changes are detected, which are the most important assessments for a caloric-effect material.

Elastocaloric materials are solids capable of stress-induced reversible phase changes during which latent heat is released or absorbed. The elastocaloric effect occurs when stress is applied or removed, and a phase change is induced. As a result of the entropy difference between the two co-existing phases, the material heats up or cools down. A good elastocaloric material must exhibit a large latent heat, a large adiabatic temperature change, good thermal conductivity, long fatigue life, and low cost. Shape memory polymers can also exhibit elastocaloric effect. Suitable elastocaloric materials are, for example, alloys, ceramics, salts and/or polymers.

The barocaloric effect comprises the heating or cooling of materials under external pressure variation. Energy, in particular thermal energy, is exchanged with the environment due to a phase change in a solid body. Molecules in a solid body that comprises a barocaloric material can have a disordered structure at and/or below a low temperature phase transition point. If a pressure (in particular, a mechanical pressure) is applied on the solid body, the molecules are transferred by movements to an ordered, structure, until a high temperature transition point is reached. During this process, the solid body releases heat to the environment, wherein thermodynamic pressure is reduced in the solid body. Additionally or alternatively, when the pressure (in particular, the mechanical pressure) on the solid body is released, the molecules are transferred by movements to the initial disordered structure. Thereby, energy is absorbed from the environment, resulting in a cooling effect. The cooling effect exceeds the previous heating effect. This cooling effect is based on the variable entropy of the material. Thereby, it is desirable to achieve larger entropy changes induced by smaller pressure applied. A class of disordered materials called plastic crystals have been found to achieve improved barocaloric effects, in particular neopentylglycol, pentaglycerin, pentaerythritol, 2-Amino-2-methyl-1,3-propanediol, hydroxymethyl, aminomethane, 2-Methyl-2-nitro-1-propanol or 2-Nitro-2-methyl-1,3-propanediol.

Thermodynamically the entropy of a system increases with a decreasing degree of order in the system. If a pressure is applied on the solid body, the order is increased, resulting in reduced entropy. If the mechanical pressure is released on the solid body (and/or negative pressure is applied), and/or when the solid body decreases its thermodynamic pressure due to emitting energy to the environment, the disorder in the system rises again and thus the entropy increases. Parallel to this, the solid body absorbs energy from the environment. Due to the entropy effects, the energy absorbed from the environment by the solid body exceeds the energy released to the environment by the solid body. In other words, the cooling effect provided by the solid body exceeds the heating effect provided by the solid body.

The phase-change component 3 is in contact with a thermally conducting medium, in particular in thermally conductive contact. The thermally conducting medium can be a fluid (e.g., gaseous and/or liquid) and/or a solid state. In examples, the thermally conducting medium has good thermal conductivity. In case the thermally conducting medium is a solid state, metal and/or plastic are suitable materials.

At a low temperature transition point and when the pressure is applied on the phase-change component 3, a first phase change is initiated wherein the thermally conducting medium is heated by the phase-change component. In this first phase change, the molecules in the phase-change component are rearranged from a disordered to an ordered structure, thus emitting energy, in particular heat, to the environment. In the first phase change the thermally conducting medium can be heated.

The low temperature phase transition point is between 17° C. to 29° C., specifically between 21° C. to 28° C., and most specifically between 25° C. to 27° C. If the phase-change component 3 is kept at or near the low temperature phase transition point, the first phase change starts immediately as soon as a pressure is applied, which leads to a reduced reaction time of the process. In case the phase-change component 3 is kept below the low temperature phase transition point, the material has to be warmed up to the low temperature phase transition point, such that the first change can be initiated. This leads to an increased reaction time for initiating the first phase change.

At a high temperature transition point and when the pressure is released from the phase-change component 3, a second phase change is initiated wherein the thermally conducting medium is cooled by phase-change component 3. In this second phase change, the molecules in the phase-change component 3 are rearranged from an ordered to a disordered structure, thus absorbing energy from the environment, in particular the thermally conducting medium, wherein the thermally conducting medium is cooled. The cooling effect applied on the thermally conducting medium exceeds the previous heating effect.

The high temperature phase transition point is between 32° C. to 48° C., specifically between 35° C. to 45° C., and most specifically between 38° C. to 42° C. If the phase-change component 3 is kept at or below the low temperature phase transition point, the second phase change is immediately initiated as soon as a pressure is released, which leads to a reduced reaction time of the process. If the high temperature phase transition point is exceeded and if the pressure is released, the phase-change component has to cool down first such that the second phase change can be initiated. This leads to an increased reaction time of the process.

In an embodiment, the phase-change component 3 has a solid-state structure.

In an embodiment, the phase-change component 3 has a porous structure, in particular a sponge structure. The sponge structure is adapted to carry a fluid (e.g., gaseous and/or liquid), in particular water, and/or vapor and can be of any suitable porous material. In particular, the phase-change component 3 comprises a nano-sponge structure. Nano-confined spaces in nano-porous materials enable anomalous physicochemical phenomena. While most nano-porous materials including metal-organic frameworks that are mechanically hard, graphene-based nano-porous materials possess significant elasticity and behave as nano-sponges that enable the force-driven liquid-gas phase transition of guest molecules. Nano-sponges are suitable for force-driven liquid-gas phase transition. Compression and free-expansion of the nanosponge afford cooling upon evaporation and heating upon condensation. The nano-sponge structure can be applied to green refrigerants such as $H_2O$ and alcohols. Cooling systems using such nano-sponges can potentially achieve high coefficients of performance.

In an embodiment, the liquid absorbed by the phase-change component 3 is at least partially evaporated by the heat emitted by the phase-change component 3 in the first phase change and is cooled by the phase-change component 3 in the second phase change.

In an embodiment, the phase-change component 3 has a plastic crystal structure. On the basis of experiments regarding the barocaloric effect, it has been discovered that with a class of disordered materials, in particular plastic crystals, improved barocaloric effects can be achieved. Suitable plastic crystal materials are neopentylglycol, pentaglycerin, pentaerythritol, 2-Amino-2-methyl-1,3-propanediol, hydroxy methyl, aminomethane, 2-Methyl-2-nitro-1-propanol or 2-Nitro-2-methyl-1,3-propanediol.

In an embodiment, the phase-change component 3 comprises neopentylglycol. In examples, the phase-change component 3 can consist of neopentylglycol.

In embodiments, the cooling element 2 comprises a cooling strip. Additionally or alternatively, the cooling element 2 can be of any suitable form and shape, for example a cuboid, band, line, net, rectangle, cylindrical or disc-shaped. The cooling element 2 can have a solid-state structure and/or a porous structure. The cooling element 2 can have a sponge-structure, in particular a nano-sponge structure. The structure of the cooling element 2 can be adapted to carry a fluid (e.g., gaseous and/or liquid).

In embodiments, the phase-change component 3 can be of any suitable form and shape, for example a cuboid, band, line, net, rectangle, cylindrical or disc-shaped. The phase-change component 3 can have a solid-state structure and/or a porous structure. The structure of the phase-change component 3 can be adapted to carry a fluid (e.g., gaseous and/or liquid). The phase-change component 3 can be arranged in and/or on the cooling element 2. In case the phase-change component 3 is arranged inside the cooling element 2, wherein the phase-change component 3 is at least partially surrounded by the cooling element 2, a supply line 4 has not to be provided or is integrally provided in the phase-change component 3 and/or the cooling element 2. In embodiments, the phase-change component 3 and cooling element 2 can have a sandwich structure comprising different layers. A composite of phase-change component 3 and cooling element 2 can be of any shape and size, including a cylinder form, strip, plate, cuboid, sphere, rectangular. The phase-change component 3 can be connected to the cooling element 2, for example by bonding or welding. In embodiments, the phase-change component and/or the cooling element each can comprise a composite including at least two different materials connected together.

In an embodiment, the cooling element 2 is coupled to the phase-change component 3 by a supply line 4. The cooling element 2 is connected to the supply line 4 on a first end, and the phase-change component 3 is connected to the supply line 4 on a second end. The supply line 4 can have a solid-state structure and/or a porous structure. The supply line 4 can comprise a sponge structure, in particular a nano-sponge structure. The supply line 4 can be of any shape and size, including a cylinder form, strip, plate, cuboid, sphere, rectangular. The supply line 4 can comprise different layers connected together of different materials and structures. The structure of the supply line 4 can be adapted to carry a fluid. The supply line 4 can comprise a hollow cylinder comprising the thermally conducting medium inside.

In an embodiment, the supply line 4 comprises the thermally conducting medium. The supply line 4 transmits the cooling applied by the phase-change component 3 on the thermally conducting medium to the cooling element 2. In one embodiment, phase-change component 3, cooling element 2 and supply line 4 each are of a solid state. In this case, the supply line 4 is connected to the cooling element 2 and the phase-change component for example by welding or bonding. In another embodiment, cooling element 2, phase-change component 3 and supply line 4 comprise a porous structure, in particular the sponge or nano-sponge structure, that is adapted to carry a liquid. In an example, the liquid can be applied on the cooling element 2, which transfers the liquid via the supply line 4 to the phase-change component. In turn the phase-change component 3 can apply heat on the liquid in the first phase change, resulting in evaporation. In the second phase change, the fluid is cooled by the phase-change component. The supply line 4 is adapted to transfer a fluid from the phase-change component 3 to the cooling element 2. In case that the cooling element 2, the supply line 4 and the phase-change component 3 each comprise a porous structure, wherein the porous structure is adapted to carry a fluid, the cooled fluid can be supplied from the phase-change component 3 to the cooling element 2. The porous structure, for example the nano-sponge structure, can thereby act as a wick, that wicks the fluid back to the cooling element 2, in particular by capillary action and/or vapor pressure. As a result, during a shaving operation, the user feels a moistened cooling on the skin (K).

Figure 2:
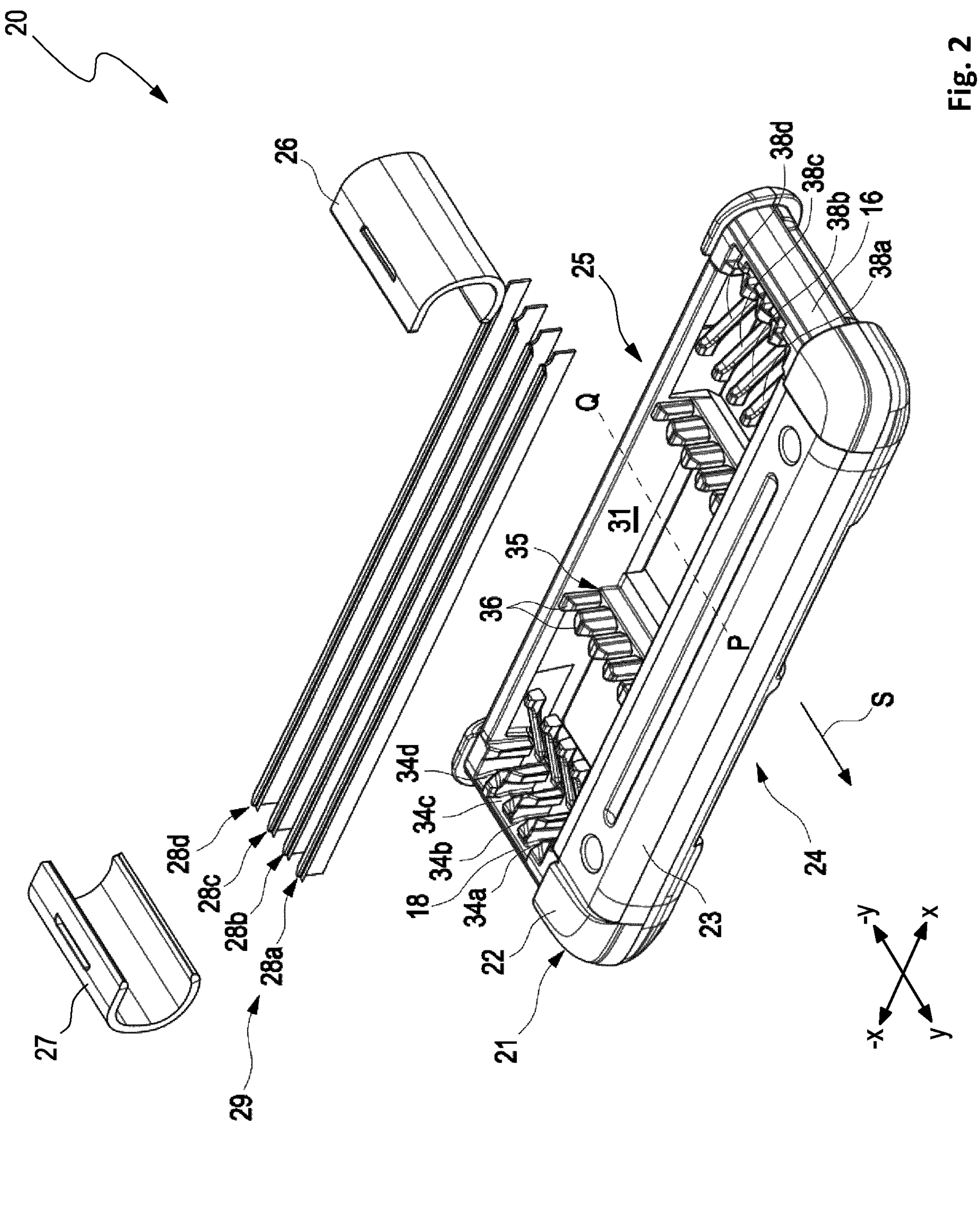
FIG. 2 is a perspective partial exploded view of a razor head.
Figure 3:
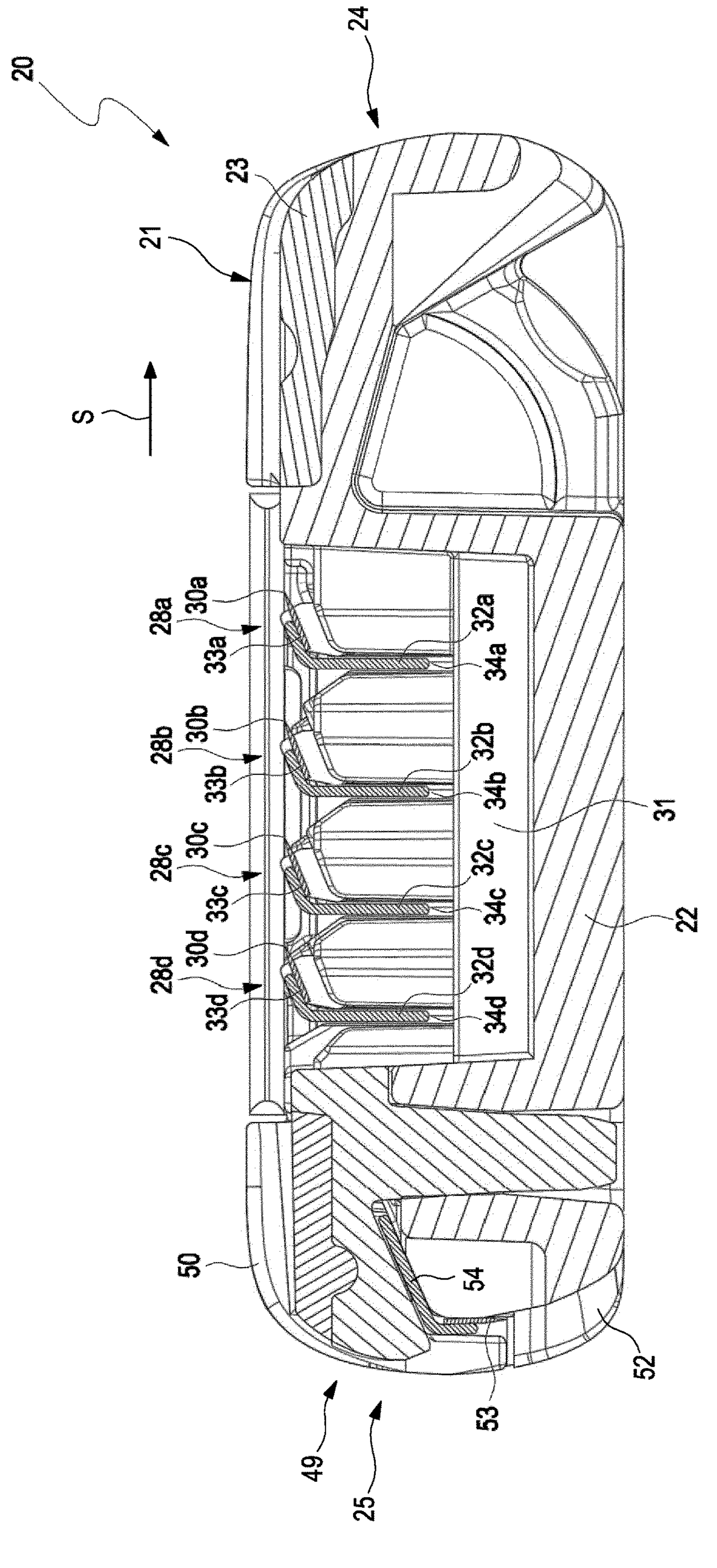
FIG. 3 is a schematic cutaway side view of a razor head taken from the embodiment of FIG. 2 along axis P-Q

FIGS. 2 and 3 are a perspective partial exploded view and a schematic cutaway side view of a razor head 20 taken from the embodiment of FIG. 2 along axis P-Q according to a second aspect. "Partial exploded view" means that some minor components of the razor head 20 have been omitted from the exploded view to aid clarity of the drawing.

The razor head 20 comprises a frame 21. The frame 21 comprises a leading longitudinal member 24 and a trailing longitudinal member 25 and at least one transverse frame member 35 disposed in between, and joining, the leading longitudinal member 24 and the trailing longitudinal member 25, in a transverse direction of the razor head 20.

The at least one transverse frame member 35 comprises a plurality of cutting member guides 36*a-d* defining a plurality of cutting member support slots, each cutting member support slot configured to accommodate a longitudinal cutting member.

The shaving direction S is depicted in FIG. 2 using arrow S. In use, the razor head 20 contacts a shaving plane SP, and is translated by the user across the shaving plane SP in the direction of arrow S.

A frame 21 may be fabricated partially or completely of synthetic materials, such as plastic, resin, or elastomers. The frame 21 comprises a platform member 22. A guard member 23 is, in an example, provided as a substantially longitudinal edge of the razor head 20. In use, the guard member 23 is the first portion of the razor head 20 to contact uncut hairs, and it is thus located at a leading longitudinal member 24 of the razor head 20. The side of the razor head 20 opposite to the leading longitudinal member 24 of the razor head 20 and opposite to the shaving direction S is the trailing longitudinal member 25 of the razor head 20. The trailing longitudinal member 25 is thus the final portion of the razor head 20 to contact the shaving plane SP, in use.

It will be noted that the terms "leading longitudinal member 24" and "trailing longitudinal member 25" are used to denote specific locations on the razor head 20, and do not imply or require the absence or presence of a particular feature. For example, a guard member 23 may in one example be located at the side comprising the "leading longitudinal member 24", and in another example a trimming blade 53 may be located at the side comprising the "trailing longitudinal member 25" in another example, but it is not essential that these sides of the razor head 20 comprise such features.

The guard member 23, in an example, comprises an elastomeric member (not shown in FIG. 2). In an example, the elastomeric layer comprises one or more fins extending longitudinally in parallel to the guard member 23 and substantially perpendicularly to the shaving direction. One purpose of such an elastomeric layer is, for example, to tension the skin prior to cutting.

The razor head 20 may, in embodiments, further comprise a cap member 29 at, or near to, the trailing longitudinal side 25 but this is not illustrated in the embodiment of FIG. 2 as an aid to clarity.

The razor head 20 further comprises a group of cutting members 28*a-d* accommodated in a cutting member receiving section 31 of the frame 21. The group of cutting members 28*a-d* comprises a plurality of longitudinal cutting members 28*a-d*. In embodiments, each of the longitudinal cutting members 28*a-d* comprises a blade 33*a-d* having a cutting edge 30*a-d*. The group of cutting members 28*a-d* is disposed in the frame 21 longitudinally and transverse to the shaving direction S such that in use, the blades 33*a-d* of the cutting members 28*a-d* contact a shaving plane SP and cut hair present on the shaving plane SP as the razor head 20 is moved across the shaving plane SP in the shaving direction S.

The razor head 20 is provided with four cutting members 28*a-d*. In embodiments, the razor head 20 can be provided with at least one cutting member 28. In particular, the razor head can be provided with one cutting member, two cutting members, three cutting members, four cutting members, five cutting members, six cutting members, seven cutting members or more cutting members.

The group of cutting members 28*a-d* defines a plurality of substantially parallel inter-blade spans. In conventional razor heads having blades above the support, with three or more blades, each inter-blade span is measured to be constant in a range of about 1.05 mm to 1.5 mm. The number of inter-blade spans is one fewer than the number of cutting members.

The frame 21 further comprises a first retainer 26 and a second retainer 27 configured to hold the cutting members 28*a-d* within the frame 21 of the razor head 20. The frame 21 further comprises first 16 and second 18 side portions. When the razor head 20 is assembled, the first and second side portions 16, 18 are configured to confine the longitudinal ends of the guard member 23, a cap member (if present, not shown in FIG. 2) and the group of cutting members 28*a-d*. The first side retainer 26 and second retainer 27 may comprise, for example, plastic, an elastomer, or a metal material and furthermore may be of a different shape to that illustrated.

In an example, the cutting members 28*a-d* comprised in the group of cutting members 28*a-d* are disposed in the razor head 20 such that two cutting edges 30*a,b* comprised, respectively, on the two foremost (nearest to the leading longitudinal member 24 of the razor head 20) cutting members 28*a,b* of the group of cutting members 28*a-d* define a leading inter-blade span that is closest to the leading longitudinal side 24 of the razor head 20 and that is greater than a trailing inter-blade span defined between the two cutting edges that are closest to the trailing longitudinal side 25 of the razor head.

The razor head 20 of FIG. 2 comprises four resilient fingers 38*a*, 38*b*, 38*c*, 38*d* under the first retainer 26. The razor head 20 comprises four resilient fingers under the second retainer 27 that are in transverse corresponding alignment with the four resilient fingers 38*a*, 38*b*, 38*c*, 38*d* under the first retainer 26.

In total, the eight resilient fingers each exert a bias force against respective cutting members 28*a-d* of the group of cutting members 28*a-d* in the direction of the shaving plane SP, such that the cutting members 28*a-d* of the group of cutting members 28*a-d* are in a rest position, when the razor head 20 is assembled. In the rest position, the cutting edges 30 of the blades 33 of the cutting members 28*a-d*, bear against corresponding stop portions at each lateral end of the blades 33 near the first 26 and second 27 retainers, for example. In an example, the stop portions may be the first 26 and second 27 retainer.

Accordingly, the rest position of the cutting members 28*a-d* is well defined, enabling a high shaving precision. Of course, the illustrated biasing arrangement has many variations. For example, a further plurality of resilient fingers may be provided on one or more of the transverse frame members 35. In a simplified razor head design (such as for low cost, disposable razors), the resilient fingers may be omitted. A skilled person will appreciate that the number of resilient fingers 38 to be provided is related to the number of cutting members 28*a-d* in the group of cutting members 28*a-d*, and that fewer or more than eight resilient fingers 38 can be provided.

In an example, each cutting member 28*a-d* in the group of cutting members 28*a-d* comprise a longitudinal blade support 32. A longitudinal blade 33 is mounted on the blade support 32. The cutting edge 30 of a blade 28*a-d* is oriented forward in the direction of shaving S. The blade support 32 of a blade 28*a-d* is an elongated, bent piece of rigid material. In an example, the blade support 32 is a metal such as austenitic stainless steel.

Each cutting member 28*a-d* in the group of cutting members 28*a-d* is, in an example, resiliently mounted in a blade receiving section 31 of the razor head 20. The blade receiving section 31 comprises a longitudinal space in the razor head 20 that is sized to accommodate the group of cutting members 28*a-d*. At least one cutting member 28*a* of the group of cutting members 28*a-d*, up to all cutting members in the group of cutting members 28*a-d* may be resiliently mounted in the blade receiving section 31. In the illustrated example of FIG. 2, the transverse inner sides of frame 21 comprise a plurality of holding slots 34. Each holding slot 34 on the transverse inner sides is configured to accept and retain an end of one side of a blade support 32 of a cutting member 28*a* of the group of cutting members 28*a-d* so that the cutting members 28*a-d* of the group of cutting members 28*a-d* are held in the blade receiving section 31 with a substantially parallel inter-blade span in the transverse direction (−x to x). Therefore, as many holding slots 34 are provided in each transverse inner side of frame 21 as there are blades.

Between the cutting member receiving section 31 and the handle (in a part adjacent to a handle 2 connection, for example) there are, in examples, provided one or more transverse frame members 35 that are integrally formed with the frame 21. The transverse frame members 35 comprises a plurality of cutting member guides 36*a-d* provided as a plurality of protuberances aligned with the holding slots 34*a-d* on the transverse inner sides of the frame 21. The cutting member guides 36*a-d* function to regulate the parallel inter-blade span.

The cutting member guide 36 is provided on a portion of the transverse frame member 35 as a protrusion. For example, the cutting member guide 36 is provided as an injection-molded protrusion of the transverse frame member 35. For example, the cutting member guide 36 is integrally formed with the transverse frame member 35. In an example, each cutting member guide 36 of the plurality of cutting member guides 36*a-d* is aligned on a common axis of the at least one transverse frame member. In another example, each cutting member guide of the plurality of cutting member guides is aligned on a central axis of the at least one transverse frame member 35. In another example, at least one cutting member guide 36 is aligned away from a common axis or central axis 35 of the at least one transverse frame member 35.

A longitudinal skincare element 50 is held on an example longitudinal trailing assembly 49. In an example, the alternative razor head comprises a trimming blade assembly 53. A skilled person will appreciate that the example longitudinal trailing assembly 49 may be omitted without loss of generality. The cutting members 28*a-d* comprise blade supports 32*a*-32*d* and their blades 33 are positioned in-between the cutting member guides 36*a*-36*d*.

In embodiments, the razor head 20 is designed to accommodate two, three, four, five, six, or more cutting members 28*a-d* comprising blade supports 32*a*-32*d* (and their blades).

In embodiments, the blade supports 32*a*-32*d* each comprise blades facing towards the shaving plane SP (not illustrated).

In embodiments, the blade supports 32*a*-32*d* each comprise blades facing away from the shaving plane S. In other words, the blades may be mounted “underneath the blade support”. The phrase “underneath the blade support” for the purposes of this specification means a side of a blade support of a razor head that is furthest from a shaving plane SP (skin) of a user when the razor head is in use.

In embodiments, the blade guides 36*a*-36*d* are configured to support "bent blades" having a radiused portion in which the cutting edge is integral with (formed from the same piece of metal) as the blade support, as known to a skilled person. Blade guides 36*a*-36*d* configured to support "bent blades" may, for example, comprise a curved upper portion configured to support or accommodate the radius portion of the "bent blade"; for example.

Figure 4A:
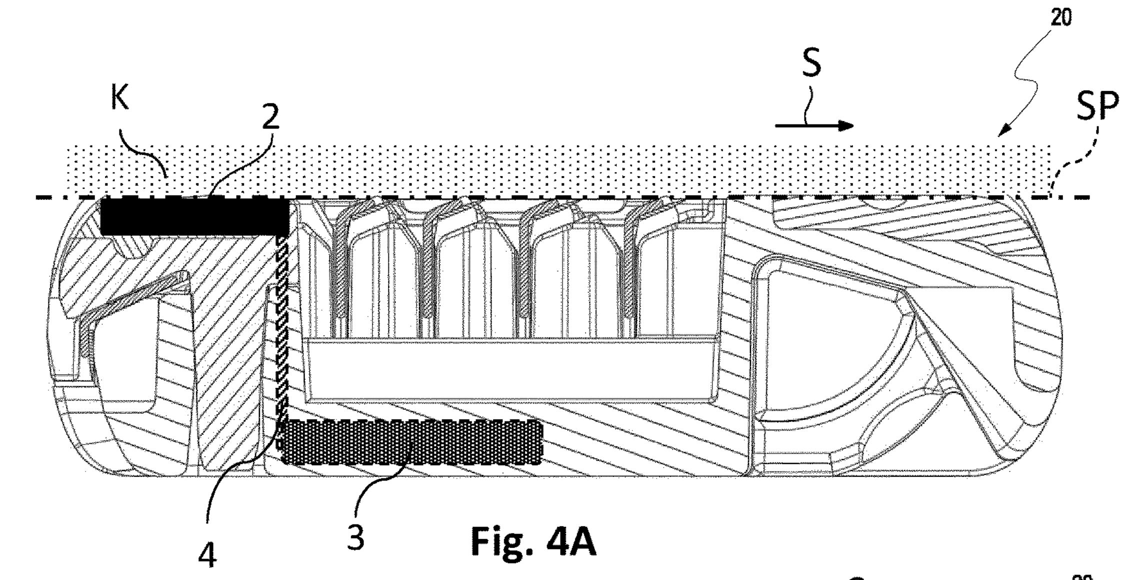
FIGS. 4A to 4C are schematic side views of a razor head comprising a razor component.
Figure 4B:
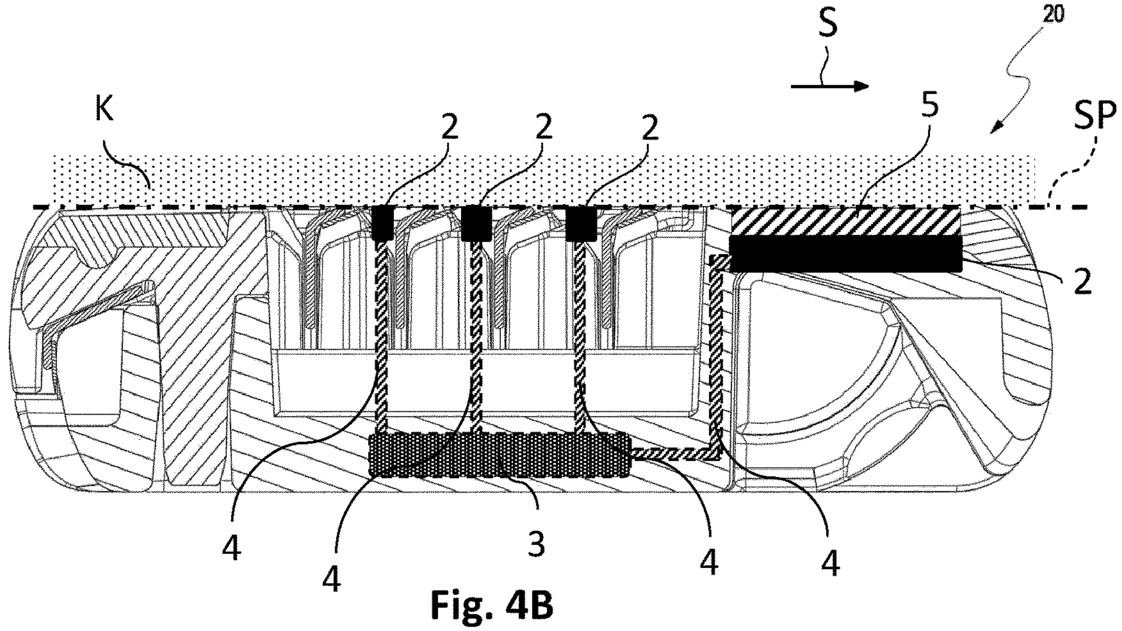
Figure 4C:
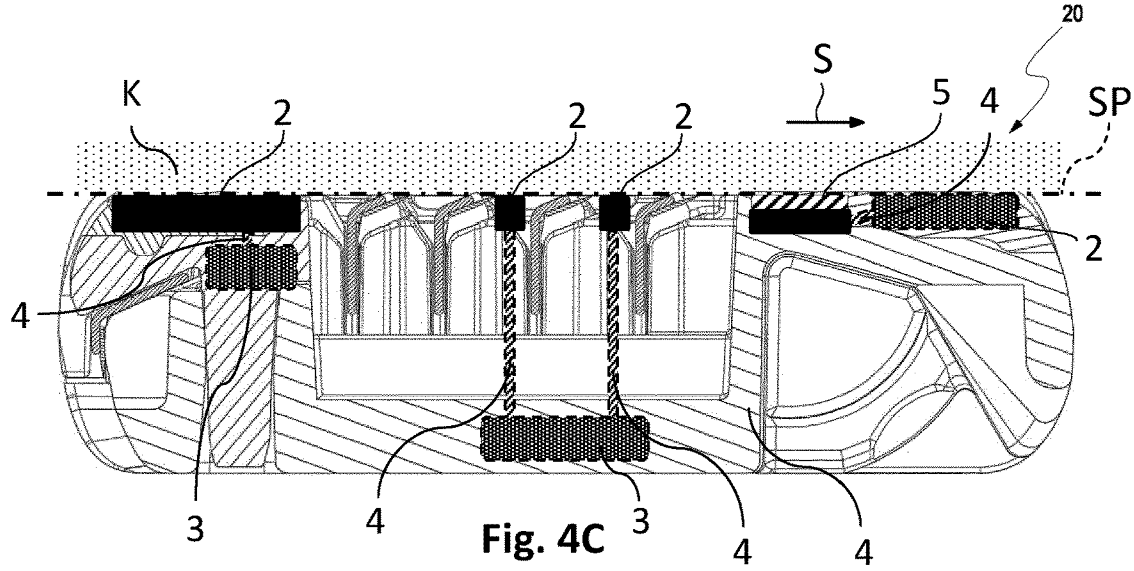

FIGS. 4A to 4C are schematic views of a razor head 20 according to another aspect. The razor head 20 comprises the razor component 1 as described above.

In embodiments, the cooling element 2 is arranged in the razor head 20. In particular, the cooling element 2 can be arranged inside the razor head 20. In this case, the razor head 20 is provided with a thermally conductive material 5, wherein the cooling element 2 indirectly transfers the cooling to a user's skin (K) via the thermally conductive material 5. The thermally conductive material 5 may be a separate component provided between cooling element and shaving plane SP or may be integrally formed in the razor head 20.

Additionally or alternatively, the cooling element 2 is arranged on the razor head 20, optionally touching the razor shaving plane SP. In particular, the cooling element 2 is arranged at the leading and/or trailing longitudinal member 24, 25 adjacent to the cutting members 28*a*-*d*. In this arrangement, the cooling element is directly contacting the user's skin (K).

Additionally or alternatively, the cooling element 2 is arranged between and adjacent the cutting members 28*a*-*d*, optionally touching the razor shaving plane SP. Thereby, the inter-blade spans and the plurality of cutting member guides 36*a*-*d* may be adapted such that the at least one cooling element 2 can be arranged between the cutting members 28*a*-*d*. The plurality of cutting member guides 36*a*-*d* may provide a support for the at least one cooling element 2, such that the at least one cooling element 2 can be mounted on the cutting member guides 36*a*-*d*.

In an embodiment, the phase-change component 3 is arranged in and/or on the razor head 20. The phase-change component 3 can be arranged inside the razor head 20 at the leading and/or trailing longitudinal member 24, 25 and/or inside the razor head 20 between leading and trailing longitudinal member 24, 25. Additionally or alternatively, the change-phase component 3 can be arranged on the razor head 20, optionally touching the razor shaving plane SP. In particular, the change-phase component 3 can be arranged at the leading and/or trailing longitudinal member 24, 25 adjacent to the cutting members 28*a*-*d* and/or between the cutting members 28*a*-*d*. With this arrangement, the phase-change component 3 is directly contacting the user's skin (K).

In another embodiment, the phase-change component 3 is provided directly on the cooling element 2, whereby a supply line 4 does not have to be provided.

Figure 5:
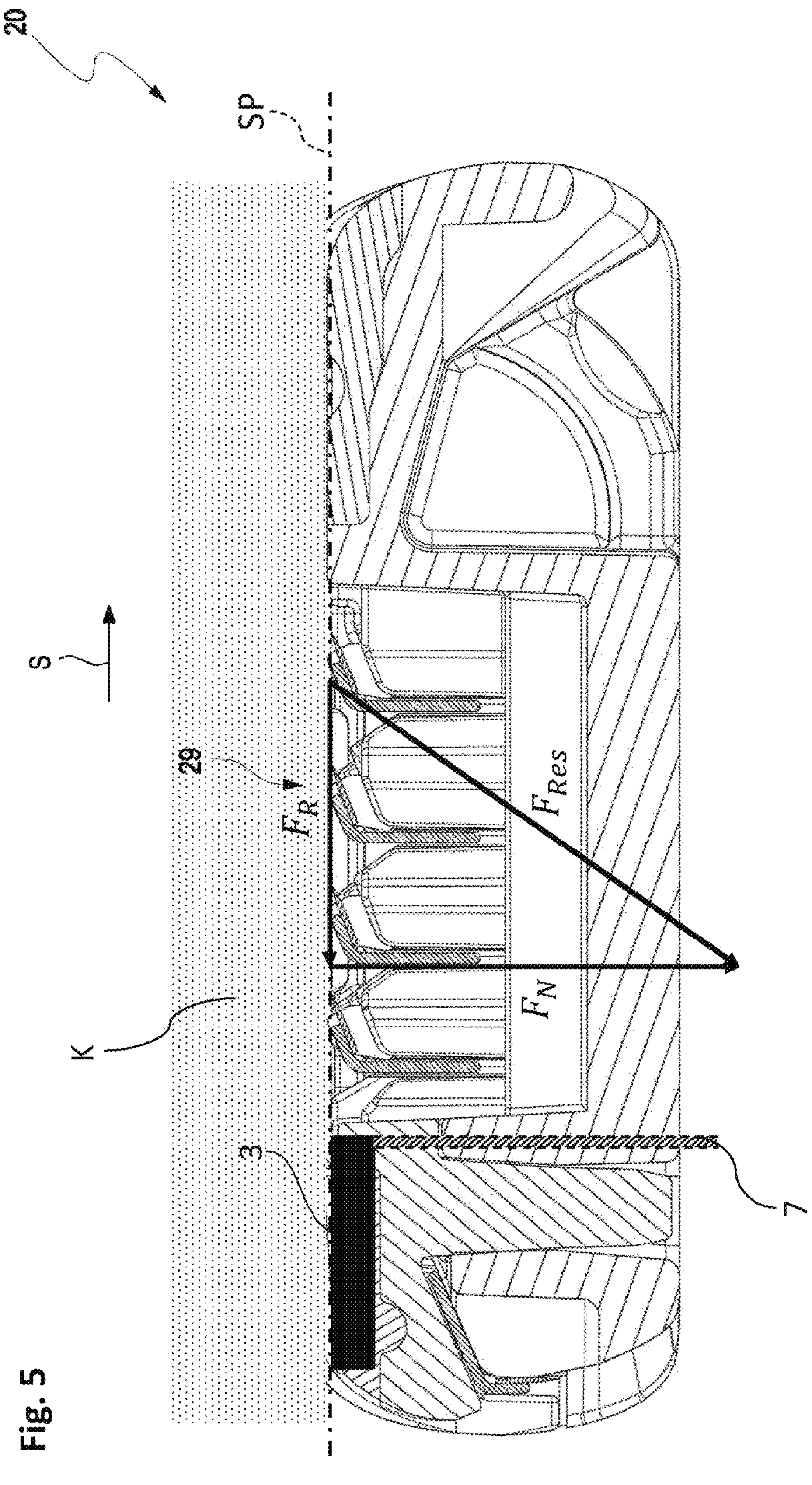
FIG. 5 is a schematic side view of a razor head.

During a shaving operation by a user and when the razor head 20 contacts the skin K of a user, a force is generated on the razor head 20. During a shaving operation by a user in which the razor head is applied on the skin in the shaving plane SP and/or due to the shaving strokes in shaving direction S, a normal force $F_N$ and a friction force $F_R$ are generated which together form a resulting force $F_{Res}$ on the razor head 20, as illustrated in FIG. 5. The resulting force $F_{Res}$, generated by a shaving operation and applied to certain areas of the razor head 20, can be scaled accordingly.

In an embodiment, the resulting force $F_{Res}$ is transmitted through the razor head 20 to the phase-change component 3, resulting in the pressure applied on the phase-change component 3. In case the phase-change component 3 is arranged on the razor head 20 in the shaving plane SP, the resulting force $F_{Res}$ is directly applied on the phase-change component 3, resulting in the pressure applied on the phase-change component 3. In case the phase-change component 3 is arranged in and/or on the cooling element 2, the resulting force $F_{Res}$ is transmitted through the cooling element 2 and/or the razor head 20 to the phase-change component 3, resulting in the pressure applied on the phase-change component 3.

In case the cooling element 2 is not directly contacting the phase-change component 3, wherein a distance occurs between cooling element 2 and phase-change component 3, the cooling element 2 is coupled to the phase-change component 3 by the supply line 4. In case the cooling element 2 is directly contacting the phase-change component 3, the supply line 4 does not have to be provided or the supply line 4 is integrally formed in the phase-change component 3 and/or in the cooling element 2.

Figure 6:
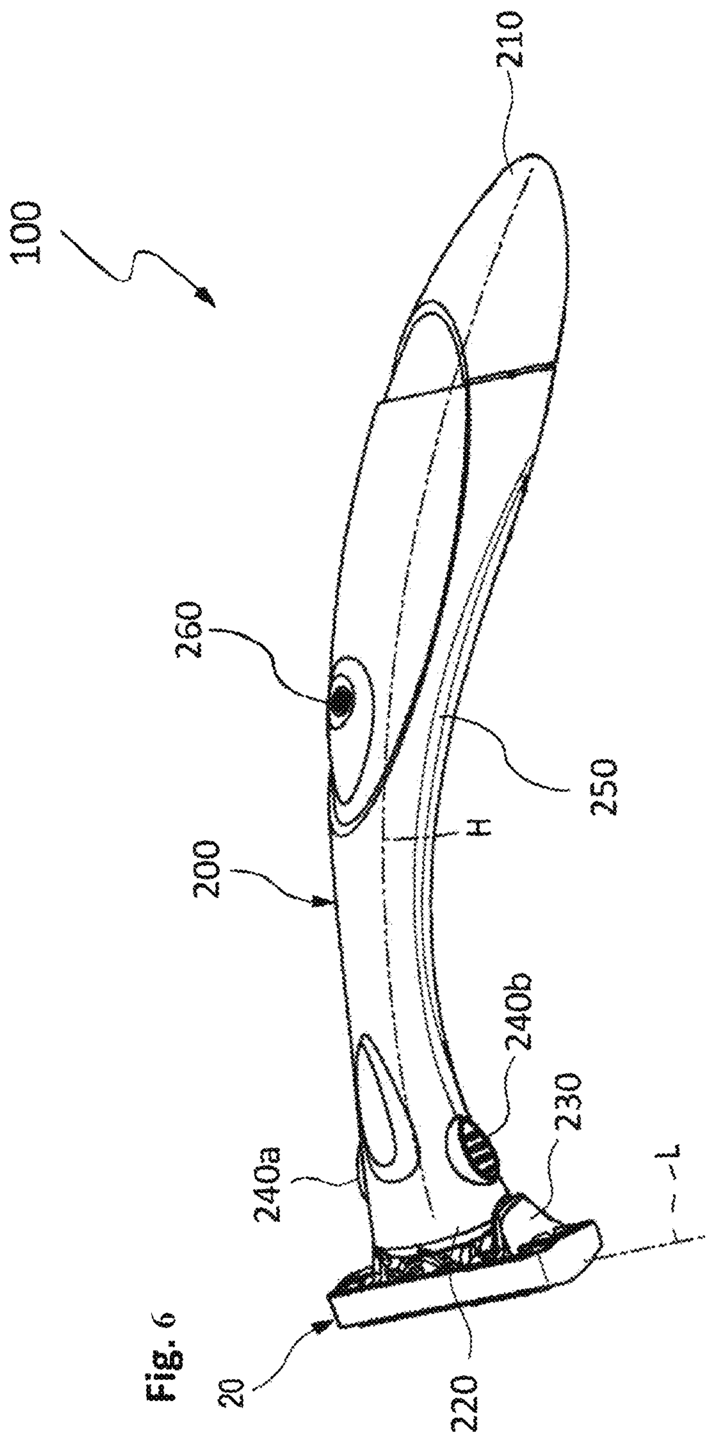
FIG. 6 is a perspective view of a razor.

FIG. 6 is a perspective view of a razor 100 according to another aspect. The razor 100 comprises a razor handle 200, a razor head 20 and a razor component 1 as described hereinabove. It should be noted that the razor 100 comprising the razor handle 200, the razor head 20 and the razor component 1 can be any wet shaving razor known in the state of the art including shaving blades, wherein hairs are removed due to a movement, in particular due to shaving strokes in shaving direction S, by a user on the skin K. Alternatively, the razor 100 comprising the razor handle 200, the razor head 20 and the razor component 1 can be any electrically operated razor (or dry razor) as known in the state of the art, wherein the razor 100 comprises a rotating or oscillating blade, powered by an electric module (e.g. a battery).

The razor handle 200 extends in a handle direction H between a proximal portion 210 and a distal portion 220 of the razor handle 200. The razor head 20 is mounted at the distal portion 220 of the razor handle 200. The mounting of the razor head 20 to the distal portion 220 of the razor handle 200 in the illustration is, in an embodiment, via a coupling 230, in an example, a pivotable bearing member, enabling a frame of reference of the razor handle 200 to vary relative to a frame of reference of the razor head 20. This enables the angle of the razor head 20 against the skin of a user to vary and adapt to changes during use.

In particular, the razor head 20 pivots relative to the razor handle 200 about the longitudinal axis L of the razor head 20, in use. The pivoting enables the user to adapt to contours of the body, for example. The longitudinal axis L of the razor head 20 is substantially perpendicular to the shaving direction S along the razor handle 200. Another example of a connection mechanism for connecting the razor head 20 to the handle 200 is discussed in WO2006/027018 A1. Another example is a razor head 20 that may pivot relative to a second pivot axis (a rocking axis), substantially perpendicular to axis L.

In embodiments, the pivotable bearing member 230 may be omitted (not illustrated) and the handle 200 provided as an integrally connected part of the support of the razor head 20. In an example, the pivotable bearing member 230 may further comprise, or be replaced by, a release mechanism 240*a*, 240*b*, enabling rapid release of an exhausted razor head 20 from the razor handle 200.

In an embodiment, the razor handle 200 and the support of the razor head 20 are integrally formed with a pivotable bearing member (not illustrated) such as a resilient plastic spring member.

In an embodiment, the frame 21 of the razor head 20 is connectable to the razor handle 200 of the razor 100 either integrally, or by a connection mechanism such as the pivotable bearing members 230 or by an interconnecting member (not shown). Although not illustrated, the pivotable bearing member 230, in an embodiment, be provided on the side of the razor head 20 configured to connect to a pivotable handle 2. The pivotable bearing member 230, in an example, comprises two or more shell bearings configured to connect to a pivotable bearing member of the razor handle 200.

In an embodiment, the razor handle 200 is provided with a handle grip 250 formed of a rubber, or rubber-like material to improve gripping friction.

Figure 7A:
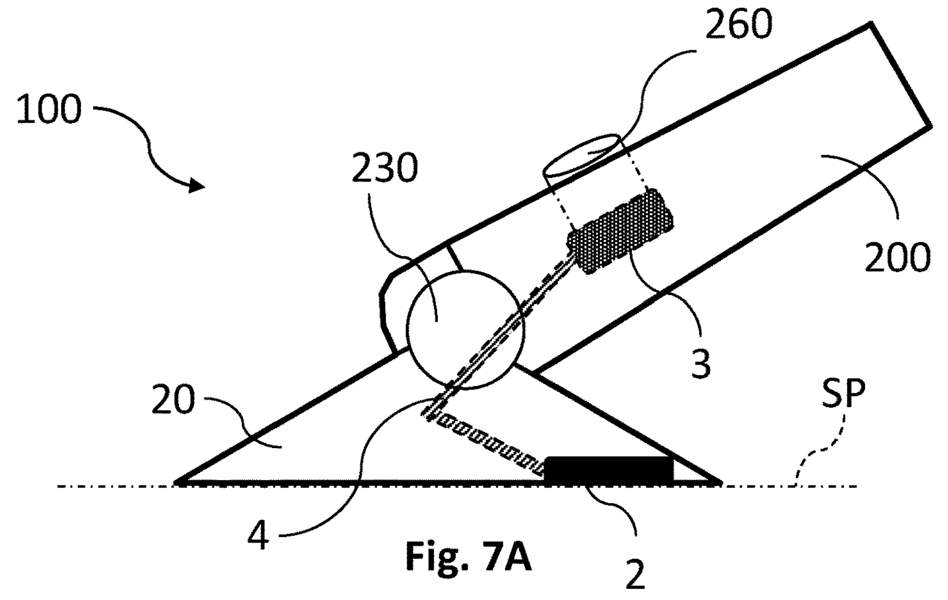
FIGS. 7A to 7C are schematic side views of the razor comprising a razor handle, a razor handle and a razor component.
Figure 7B:
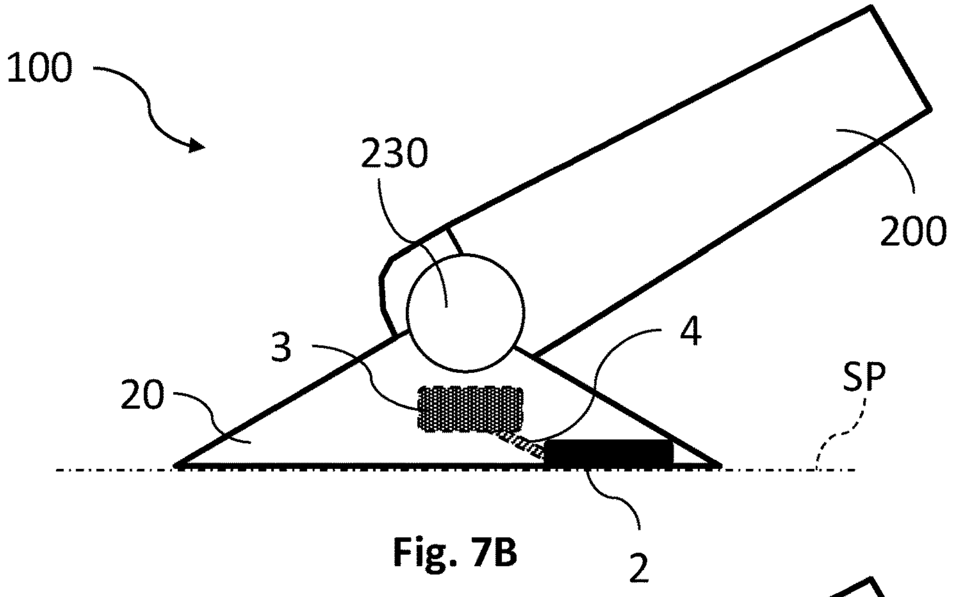
Figure 7C:
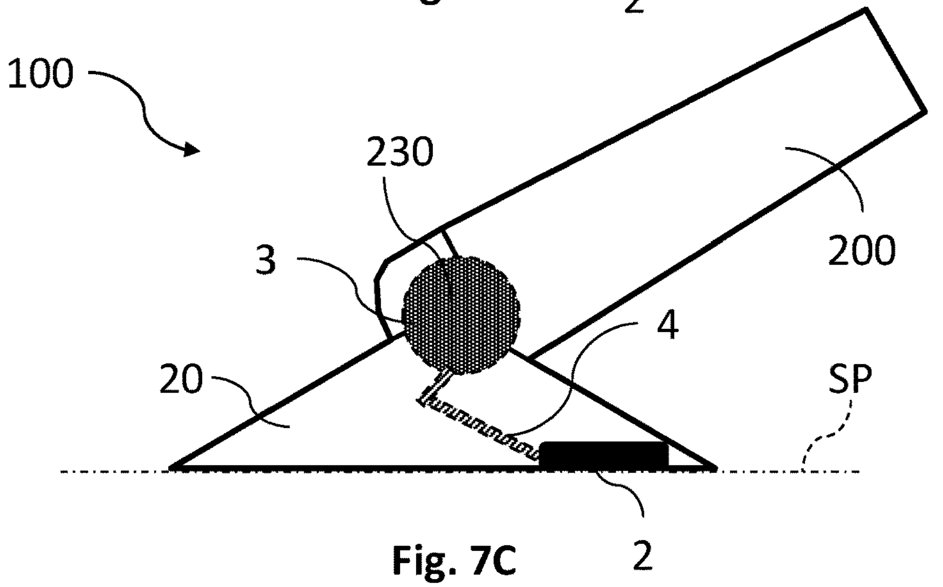

The razor 100 comprises the razor component 1 as described hereinabove. The razor head 20 comprises the common features as described hereinabove and as shown in FIGS. 2 and 3. As shown in FIGS. 4A to 4C, the cooling element 2 is arranged in and/or on the razor head 20 as described above. FIGS. 7A to 7C are schematic views of a razor 100 comprising a razor component 1 as described above.

In an embodiment, the phase-change component 3 is arranged in the razor handle 200 and/or the razor head 20. In particular, the phase-change component 3 may be arranged inside and/or on the razor handle 200 and/or the razor head 20. The embodiment, wherein the phase-change component 3 is arranged in, in particular inside and/or on, the razor head 20, is described above and illustrated in FIGS. 4A to 4C.

In an embodiment, the phase-change component 3 is integrally provided in the material structure of the razor head 20. Thereby, the structural material of the razor head 20 may be formed of an inner core of the phase-change component 3 and an outer surrounding layer (or layers) of plastic, metal, or other suitable skin contacting materials.

In an embodiment, the phase-change component 3 is arranged between the razor handle 200 and the razor 20, in particular in the coupling 230 between razor handle 200 and razor head 20. As already mentioned above, in an example, the razor head 20 is either releasably attached to the razor handle 200 via a pivotable or non-pivotable coupling 230, integrally formed with the razor handle 200 via a non-pivotable coupling 230, or integrally formed with the razor handle 200 via a pivotable coupling 230.

The supply line 4, that couples the phase-change component 3 to the cooling element 2 is arranged in the razor 100. In particular, the supply line 4 is arranged in the razor head 20 and/or in the razor handle 200 and/or between razor head 20 and razor handle 200.

Figure 8:
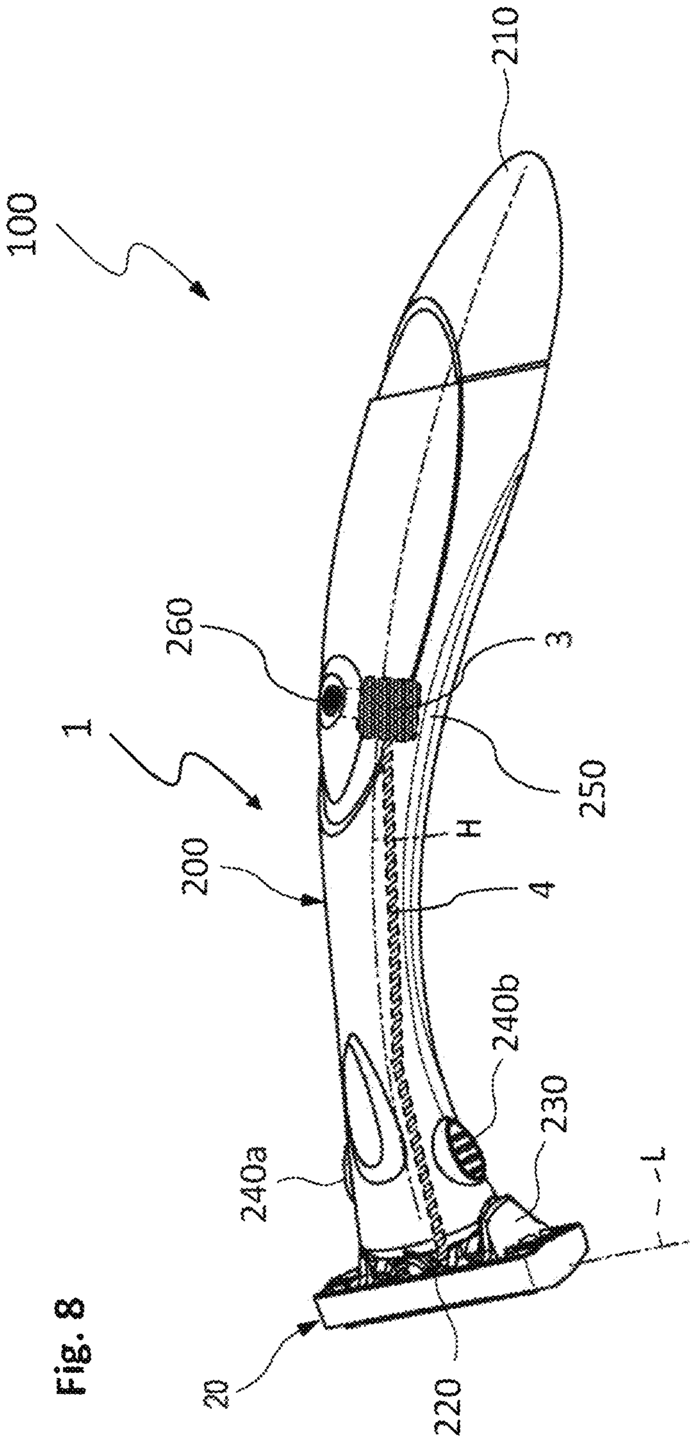
FIGS. 8 and 9 are perspective views of a razor comprising the razor component, wherein the phase-change component is arranged in the razor handle.
Figure 9:
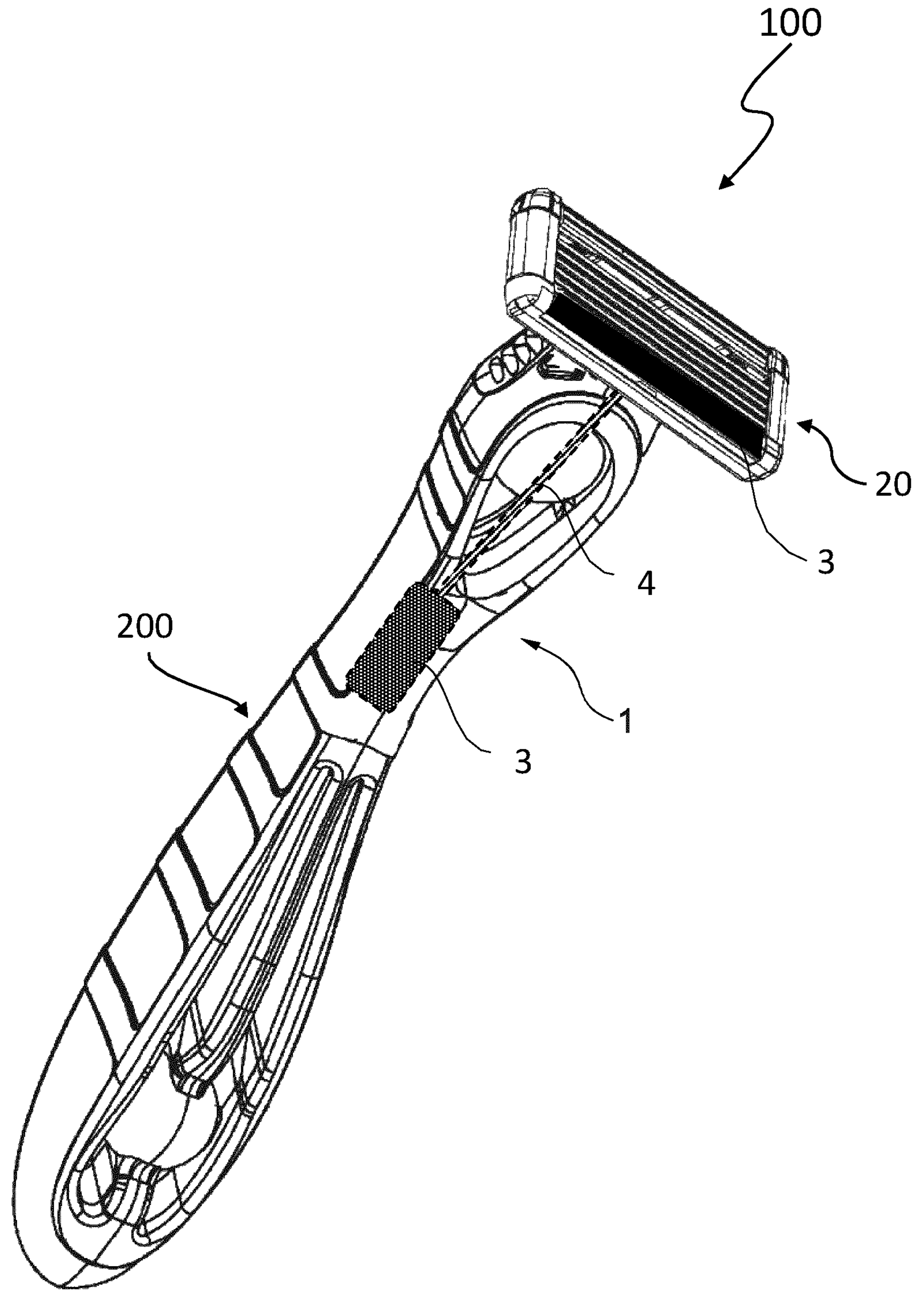

FIGS. 8 and 9 are perspective views of the razor 100 comprising the razor component 1, wherein the phase-change component 1 is arranged in the razor handle 200.

In embodiments, a pressure generating device 260 is arranged in the razor handle 200 and/or the razor head 20. In addition, the pressure generating device may be arranged between the razor handle 200 and the razor head 20. The pressure generating device 260 is directly and/or indirectly contacting the phase-change component 3. The pressure generating device 260 is adapted to generate a pressure and to apply the pressure on the phase-change component 3. This pressure can be provided additionally or alternatively to the pressure generated by the resulting force Files, acting on the razor head 20 due to a shaving operation by a user and being applied on the phase-change component 3, as described hereinabove.

In embodiments, the pressure generating device 260 comprises a button that indirectly and/or directly contacts the phase-change component 3 and applies the pressure on the phase-change component 3, in particular wherein the pressure is generated due to a user's pushing action on the button. In an embodiment, the razor handle 200 comprises the button. The button can be moved in a direction vertical to the handle direction H, wherein a user applies a force on the button in vertical direction, wherein the button applies the pressure on the phase-change component.

In an embodiment, the pressure generating device 260 can be designed as a switch that is adapted to be moved along the handle direction H by a user from an initial, unengaged position, to a deflected, engaged position. In the initial, disengaged position, the pressure generating device 260 can be distanced to the phase-change component 3 and/or cannot apply a pressure on the phase-change component. In the deflected, engaged position, the pressure generating device 260 can apply a pressure on the phase-change component 3 in handle direction H and/or the direction vertical to the handle direction H due to a user's moving action. The pressure generating device 260 can be guided on a path extending along the handle direction H.

In an embodiment, the pressure generating device 260 can comprise a toggle, that is tiltable from the initial, disengaged position wherein the pressure generating device 260 is distanced to the phase-change component 3 and/or cannot apply a pressure on the phase-change component 3 to the engaged position, wherein the pressure generating device 260 applies pressure on the phase-change component 3.

In embodiments, the pressure generating device 260 comprises a latching mechanism, that holds the pressure generating device 260 in the engaged position, until a user applies a resetting action on the pressure generating device 260, wherein the pressure generating device 260 moves back to the initial, disengaged position.

In embodiments, the pressure generating device 260 is be operated electrically or pneumatically.

In embodiments, the pressure generating device 260 further comprises a pressure amplifying device. In an embodiment, the pressure amplifying device may be configured as a grip induced lever mechanism. Thereby, in case the razor handle 200 is gripped by a user, the pressure amplifying device applies a pressure on the phase-change component 3.

In embodiments, the pressure amplifying device is configured as a bi-stable clamp that applies a pressure on the phase-change component during a shaving operation. The bi-stable clamp can be operated by the resulting force $F_{Res}$, that is applied on the razor head 20 during a shaving operation and is transmitted to the bi-stable clamp via the razor head 20 and/or the razor handle 200.

In embodiments, the razor 100 comprises an auxiliary heating device that is configured to keep the razor 100, in particular the phase-change component 3, at the low temperature phase transition point during a non-shaving operation. The non-shaving operation may occur during a rinsing operation of the razor 100 and/or during a storage of the razor 100 in a storage facility. The auxiliary heating device may be arranged in the razor handle 200 and/or in the razor head 20 and/or between the razor handle 200 and the razor head 20 and/or surrounding the razor 100. In case the auxiliary heating device is surrounding the razor 100, the auxiliary heating device can be integrally provided in the storage facility. The auxiliary heating device yields the advantage, that the phase-change component 3 is kept at or near the low temperature phase transition point, even when razor 100 is rinsed with cold water. If a pressure is applied on the phase-change component 3, the mechanocaloric effect, in particular the barocaloric effect, is directly initiated due to keeping the phase-change component 3 at the low temperature phase transition point.

In embodiments, the phase-change component 3 can be incorporated in the razor design in a way, wherein the phase-change component 3 passively resists to be cooled below the low temperature phase transition point (the first phase change temperature range), which might occur, for example, by a rinsing of the razor 100 with cold water. In other words, the energy, in particular heat, released to the environment in the first phase change may be absorbed by surrounding components. During a rinsing operation of the razor these surrounding components may provide a thermal buffer, preventing the phase-change component 3 being cooled below the low temperature phase transition point.

In an embodiment, the phase-change component 3 is attached, in particular bonded, to a back surface of the cutting members 28*a-d*. In this embodiment, the phase-change component 3 can be of any suitable shape and size that provides a thermal recovery to the cutting members 28*a-d* subsequent to a rinsing operation, but may be small enough to avoid any fluid flow obstructions between the cutting members 28*a-d*. As a result, if the razor 100 is rinsed with cold water, the cutting members 28*a-d* function as a thermal buffer with respect to the phase-change component. Additionally or alternatively, the phase-change component 3 can be embedded in a layer of plastic, metal or other suitable skin contacting materials. Thereby, the outer layer provides a thermal buffering ability with respect to the phase-change component 3. The outer layer can be provided in the razor head 20 at locations which experience water flow during a rinsing operation to effectively counter the cooling effect, provided by the cold water. This yields the advantage that the phase-change component 3 releasing the heat in the first phase change may be incorporated in the rinsing design of the razor 100.

According to another aspect, a method is disclosed for providing a cooling effect on a user's skin surface with a razor, wherein the method comprises the following steps:

a) providing a razor 100 with a razor head 20 and a razor handle 200, configured to be coupled to the razor head 20 and a cooling element 2, b) applying and/or releasing a pressure on the razor 100, wherein the cooling element 2 provides a cooling effect on a user's skin K during a shaving operation.

In embodiments, the razor 100, the razor head 20, the handle 200 can comprise the features as described hereinabove. The razor can further comprise the razor component 1 as described hereinabove.

In particular, the method can further comprise the step of providing the razor 100 with a pressure-responsive phase-change component 3 coupled to the cooling element 2, in particular wherein the phase-change component 3 comprises a mechanocaloric material. In particular, the mechanocaloric component can be a barocaloric material, providing the cooling effect due to the barocaloric effect as described hereinabove.

The pressure can be applied and/or released on the phase-change component 3. The phase-change component 3 can be in contact, in particular in thermally conductive contact, with a thermally conducting medium. In a first phase change, in which the pressure is applied on the phase-change component 3, the thermally conducting medium can be heated by the phase-change component. In a second phase change, in which the pressure is released in the phase-change component, the thermally conducting medium can be cooled by the phase-change component 3. Due to mechanocaloric effect, in particular the barocaloric effect as described hereinabove, the cooling effect exceeds the heating effect. The thermally conducting medium can be a fluid or a solid-state.

In an embodiment, the method further comprises the step of providing a supply line 4 that couples the phase-change component 3 to the cooling element 2, wherein the supply line 4 comprises the thermally conducting medium which transmits the cooling effect to the cooling element 2. The phase-change component 3 can have a porous structure like a sponge structure, in particular a nano-sponge structure, adapted to carry the thermally conducting medium.

In embodiments, the thermally conducting medium can be a liquid, in particular water. The method can further comprise the step of prior to applying a pressure on the phase-change component 3, rinsing the razor head 20 with the liquid, wherein the phase-change component 3 absorbs at least some of the thermally conducting medium. The supply line 4 and the cooling element 2 can also have a porous structure like a sponge-structure, in particular a nano-sponge structure. During the rinsing of the razor 100, the cooling element 2 can absorb some of the liquid, in particular water, and transmit the liquid via the porous supply line 4 to the phase-change component 3. The thermally conducting medium, in particular the liquid, absorbed by the phase-change component 3 can be evaporated by the heat applied in the first phase change by the phase-change component 3, and cooled in the second phase change by the phase-change component 3. Due to the barocaloric effect, the cooling effect exceeds the previous heating effect.

In embodiments, the method can further comprise the step of providing a force on the razor head 20 that is generated during a shaving operation by a user, wherein the razor head 20 contacts the skin K of a user and transmits the force from the razor head 20 to the phase-change component 3, wherein the force generates the pressure that is applied on the phase-change component 3.

In embodiments, the method can further comprise the step of providing a pressure generating device 260 in the razor handle 200 and/or the razor head 20, wherein the pressure generating device 260 is directly or indirectly contacting the phase-change component 3.

In embodiments, the method can further comprise the step of prior to a shaving operation, providing a pushing action on the pressure generating device 260, whereby pressure is applied on the phase-change component 3.

Although the present disclosure has been described above and is defined in the attached claims, it should be understood that the disclosure may alternatively be defined in accordance with the following embodiments:

1. A razor component (1) comprising:
   a cooling element (2), which is adapted to provide a cooling effect on a user's skin (K) during a shaving operation,
   characterized in that the razor component (1) includes a pressure-responsive phase-change component (3) that is coupled to the cooling element (2).
2. The razor component according to embodiment 1, wherein the phase-change component (3) comprises a mechanocaloric material, in particular a barocaloric material.

3. The razor component according to embodiment 1 or embodiment 2, wherein a pressure is applied and/or released on the phase-change component (3).
4. The razor component according to any one of the preceding embodiments, wherein the phase-change component (3) is in contact, in particular in thermally conductive contact, with a thermally conducting medium.
5. The razor component according to any one of the preceding embodiments, wherein, at a low temperature transition point and when the pressure is applied on the phase-change component (3), a first phase change is initiated wherein the thermally conducting medium is heated by the phase-change component (3).
6. The razor component according to embodiment 5, wherein the low temperature phase transition point is between 17° C. to 29° C., specifically between 21° C. to 28° C., and most specifically between 25° C. to 27° C.
7. The razor component according to any one of the preceding embodiments, wherein, at a high temperature transition point and when the pressure is released from the phase-change component (3), a second phase change is initiated wherein the thermally conducting medium is cooled by phase-change component (3).
8. The razor component according to embodiment 7, wherein the high temperature phase transition point is between 32° C. to 48° C., specifically between 35° C. to 45° C., and most specifically between 38° C. to 42° C.
9. The razor component according to any one of the preceding embodiments, wherein the phase-change component (3) has a solid-state structure.
10. The razor component according to any one of the preceding embodiments, wherein the phase-change component (3) has a sponge structure, in particular a nano-sponge structure.
11. The razor component according to embodiment 10, wherein the thermally conducting medium is a liquid, in particular water, wherein the sponge structure is adapted to carry the liquid.
12. The razor component according to embodiment 11, wherein the liquid is at least partially evaporated by the heat emitted by the phase-change component (3) in the first phase change and is cooled by the phase-change component (3) in the second phase change.
13. The razor component according to any one of the preceding embodiments, wherein the phase-change component (3) has a plastic crystal structure.
14. The razor component according to any one of the preceding embodiments, wherein the phase-change component (3) is made of neopentylglycol.
15. The razor component according to any one of the preceding embodiments, wherein the cooling element (2) comprises a cooling strip.
16. The razor component according to any one of the preceding embodiments, wherein the cooling element (2) is connected to the phase-change component (3) by a supply line (4).
17. The razor component according to embodiment 16, wherein the supply line (4) comprises the thermally conducting medium.
18. The razor component according to embodiment 16 or embodiment 17, wherein the supply line (4) transmits the cooling applied by the phase-change component (3) on the thermally conducting medium to the cooling element (2).
19. The razor component according to any one of embodiments 16 to 18, wherein the supply line (4) comprises a nano-sponge structure, in particular, wherein the nano-sponge structure is adapted to carry a fluid.
20. The razor component according to embodiment 19, wherein the nano-sponge structure is adapted to transfer a fluid from the phase-change component (3) to the cooling element (2).
21. A razor head (20), comprising
    a razor component (1) according to any one of the preceding claims.
22. The razor head according to embodiment 21, wherein the razor head (20) further comprises a frame (21), wherein the frame (21) comprises a leading longitudinal member (24) and a trailing longitudinal member (25), and at least one transverse frame member (35) defining a razor shaving plane (SP), disposed in between, and joining, the leading longitudinal member (24) and the trailing longitudinal member (25), in a transverse direction of the razor head (20), wherein the at least one transverse frame member (35) comprises a plurality of cutting member guides (36*a-d*) defining a plurality of cutting member support slots, each cutting member support slot configured to accommodate a longitudinal cutting member (28); and a plurality of longitudinal cutting members (28*a-d*), wherein each cutting member (28) is disposed in a respective cutting member support slot.
23. The razor head according to embodiment 21 or embodiment 22, wherein the cooling element (2) is arranged in the razor head (20).
24. The razor head according to embodiment 22 or embodiment 23, wherein the cooling element (2) is arranged on the razor head (20) touching the razor shaving plane (SP), in particular at the leading and/or trailing longitudinal member (24, 25) adjacent to the cutting members (28*a-d*).
25. The razor head according to any one of embodiments 22 to 24, wherein the cooling element (2) is arranged between the cutting members (28*a-d*) touching the razor shaving plane (SP), adjacent to the cutting members (28*a-d*).
26. The razor head according to any one of embodiments 21 to 25, wherein during a shaving operation by a user and when the razor head (20) contacts the skin (K) of a user, a force is generated on the razor head (20).
27. A razor (100) comprising:
    a razor handle (200), and
    a razor head (20), which is configured to be coupled to the razor handle (200),
    characterized by a razor component (1) according to any one of claims 1 to 22.
28. The razor according to embodiment 27, wherein the razor head (20) is configured according to any one of embodiments 22 to 26.
29. The razor according to embodiment 27 or embodiment 28, wherein the phase-change component (3) is arranged in the razor handle (200) and/or the razor head (20).
30. The razor according to any one of embodiments 27 to 29, wherein the phase-change component (3) is arranged between the razor handle (200) and the razor head (20), in particular in a coupling (230) between razor handle (200) and razor head (20).
31. The razor according to any one of embodiments 27 to 30, wherein the razor head (20) is either releasably attached to the razor handle (200) via a pivotable or non-pivotable coupling (230), integrally formed with the razor handle (200) via a non-pivotable coupling (230), or integrally formed with the razor handle (200) via a pivotable coupling (230).

32. The razor according to any one of embodiments 27 to 31, wherein the supply line (4) is arranged in the razor (100), in particular wherein the supply line (4) is arranged in the razor head (20) and/or the razor handle (200), and/or between razor head (20) and razor handle (200).
33. The razor according to any one of embodiments 27 to 32, wherein a pressure generating device (260) is arranged in the razor handle (200) and/or the razor head (20).
34. The razor according to embodiment 33, wherein the pressure generating device (260) is directly and/or indirectly contacting the phase-change component (3).
35. The razor according to embodiment 33 or embodiment 34, wherein the pressure generating device (260) is adapted to generate a pressure and apply the pressure on the phase-change component (3).
36. The razor according to any one of embodiments 33 to 35, wherein the pressure generating device (260) comprises a button that applies the pressure on the phase-change component (3), in particular wherein the pressure is generated due to a user's pushing action on the button.
37. The razor according to any one of embodiments 33 to 36, wherein the pressure generating device (260) further comprises a pressure amplifying device, in particular a grip induced lever mechanism.
38. The razor according to any one of embodiments 27 to 37, wherein the razor (100) comprises an auxiliary heating device that is configured to keep the razor, in particular the phase-change component (3), at the low temperature phase transition point during a non-shaving operation.
39. The razor according to any one of embodiments 27 to 38, wherein the phase-change component (3) is attached, in particular bonded, to a back surface of the cutting members (28*a-d*).
40. A method for providing a cooling effect on a skin surface with a razor, the method comprising the steps of:
    a) providing a razor (100) with a razor head (20) and a razor handle (200), configured to be coupled to the razor head (20), and a cooling element (2),
    b) applying and/or releasing a pressure on the razor (100), wherein the cooling element (2) provides a cooling effect on a user's skin surface (K) during a shaving operation.
41. The method according to embodiment 40, further comprising:
    providing the razor (100) with a pressure-responsive phase-change component (3) coupled to the cooling element (2), in particular wherein the phase-change component (3) comprises a mechanocaloric material.
42. The method according to embodiment 41, wherein the pressure is applied and/or released on the phase-change component (3).
43. The method according to embodiment 41 or embodiment 42, wherein the phase-change component (5) is in contact, in particular in thermally conductive contact, with a thermally conducting medium.
44. The method according to embodiment 43, wherein in a first phase change in which the pressure is applied on the phase-change component (3), the thermally conducting medium is heated by the phase-change component (3).
45. The method according to embodiment 43 or embodiment 44, wherein in a second phase change in which the pressure is released on the phase-change component (3), the thermally conducting medium is cooled by the phase-change component (3).
46. The method according to any one of embodiments 43 to 45, further comprising:
    providing a supply line (4) that couples the phase-change component (3) to the cooling element (2), wherein the supply line (4) comprises the thermally conducting medium which transmits the cold to the cooling element (2).
47. The method according to any one of embodiments 43 to 46, wherein the phase-change component (3) has a sponge structure, in particular a nano-sponge structure, adapted to carry the thermally conducting medium.
48. The method according to any one of embodiments 43 to 47, wherein the thermally conducting medium is a liquid, in particular water.
49. The method according to any one of embodiments 43 to 48, further comprising:
    prior to applying a pressure on the phase-change component (3), rinsing the razor head (20) with the liquid, wherein the phase-change component (3) absorbs at least some of the thermally conducting medium.
50. The method according to embodiment 49, wherein the thermally conducting medium is evaporated by the heat applied by the phase-change component (3) and cooled by the phase-change component (3).
51. The method according to any one of embodiments 41 to 50, further comprising: providing a force on the razor head (20) that is generated during a shaving operation by a user, wherein the razor head (20) contacts the skin surface (K) of a user and transmits the force from the razor head (20) to the phase-change component (3), wherein the force generates the pressure that is applied on the phase-change component (3).
52. The method according to any one of embodiments 41 to 51, further comprising:
    providing a pressure generating device (260) in the razor handle (200) and/or the razor head (20), wherein the pressure generating device (260) is directly or indirectly contacting the phase-change component (3).
53. The method according to embodiment 52, further comprising:
    prior to a shaving operation, providing a pushing action on the pressure generating device (260), whereby pressure is applied on the phase-change component (3).

| REFERENCE NUMERALS | |
|---|---|
| H | razor handle direction |
| S | shaving direction |
| SP | shaving plane |
| L | longitudinal direction |
| CP | razor head plane |
| K | skin or skin surface |
| $F_N$ | normal force |
| $F_R$ | friction force |
| $F_{Res}$ | resulting force |
| 1 | razor component |
| 2 | cooling element |
| 3 | phase-change component |
| 4 | supply line |
| 5 | thermally conductive material |
| 16 | first side portion |
| 18 | second side portion |
| 20 | razor head |
| 21 | frame |
| 22 | platform member |
| 23 | guard member |
| 24 | leading longitudinal member |
| 25 | trailing longitudinal member |
| 26 | first retainer |
| 27 | second retainer |
| 28a-d | cutting member |
| 29 | cap member |

-continued

| REFERENCE NUMERALS | |
|---|---|
| 30a-d | cutting edge |
| 31 | cutting member receiving section |
| 32 | blade support |
| 33a-d | blade |
| 34a-d | holding slot |
| 35 | transverse frame member |
| 36a-d | cutting member guide |
| 38a-d | resilient finger |
| 49 | longitudinal trailing assembly |
| 50 | skin care element |
| 53 | trimming blade assembly |
| 54 | trimming blade support |
| 200 | razor handle |
| 210 | proximal portion |
| 220 | distal portion |
| 230 | coupling |
| 240a, b | releasing mechanism |
| 250 | handle grip |
| 260 | pressure generating device |

The invention claimed is:

1. A razor component comprising:

a cooling element, which is adapted to provide a cooling effect on a user's skin during a shaving operation, and a pressure-responsive phase-change component that is coupled to the cooling element, and wherein the phase-change component comprises a barocaloric material.

2. The razor component according to claim 1, wherein a pressure is applied and/or released on the phase-change component.

3. The razor component according to claim 1, wherein the phase-change component is in thermally conductive contact with a thermally conducting medium.

4. The razor component according to claim 1, wherein, at a low temperature transition point and when the pressure is applied on the phase-change component, a first phase change is initiated wherein the thermally conducting medium is heated by the phase-change component.

5. The razor component according to claim 4, wherein the low temperature phase transition point is between 17° C. to 29° C.

6. The razor component according to claim 1, wherein, at a high temperature transition point and when the pressure is released from the phase-change component, a second phase change is initiated wherein the thermally conducting medium is cooled by phase-change component.

7. The razor component according to claim 6, wherein the high temperature phase transition point is between 32° C. to 48° C.

8. The razor component according to claim 1, wherein the phase-change component has a solid-state structure.

9. The razor component according to claim 1, wherein the phase-change component has a sponge structure.

10. The razor component according to claim 9, wherein the thermally conducting medium is a liquid.

11. The razor component according to claim 10, wherein the liquid is at least partially evaporated by the heat emitted by the phase-change component in the first phase change and is cooled by the phase-change component in the second phase change.

12. The razor component according to claim 11, wherein the phase-change component has a plastic crystal structure.

13. The razor component according to claim 1, wherein the phase-change component is made of neopentylglycol.

14. The razor component according to claim 1, wherein the cooling element comprises a cooling strip.

15. The razor component according to claim 1, wherein the cooling element is connected to the phase-change component by a supply line.

16. The razor component according to claim 15, wherein the supply line comprises the thermally conducting medium.

17. The razor component according to claim 15, wherein the supply line transmits the cooling applied by the phase-change component on the thermally conducting medium to the cooling element.

18. A method for providing a cooling effect on a skin surface with a razor, the method comprising the steps of:

a) providing a razor with a razor head and a razor handle, configured to be coupled to the razor head, and a cooling element, b) applying and/or releasing a pressure on the razor, wherein the cooling element provides a cooling effect on a user's skin surface during a shaving operation, c) providing the razor with a pressure-responsive phase-change component coupled to the cooling element, wherein the phase-change component comprises a mechanocaloric material.

19. A razor comprising:

a razor handle, a razor head, which is configured to be coupled to the razor handle, and a razor component according to claim 1.

20. A razor component comprising:

a cooling element, which is adapted to provide a cooling effect on a user's skin during a shaving operation, and a pressure-responsive phase-change component that is coupled to the cooling element, and wherein the phase-change component comprises a barocaloric material, and at a low temperature transition point and when the pressure is applied on the phase-change component, a first phase change is initiated wherein the thermally conducting medium is heated by the phase-change component.

* * * * *